United States Patent [19]

Neve de Mevergnies

[11] Patent Number: 4,728,149
[45] Date of Patent: Mar. 1, 1988

[54] SEAT FOR VEHICLE, NOTABLY MOTOR VEHICLE

[76] Inventor: Marcel Neve de Mevergnies, La Pasture, 6419 Marbix-la-Tour, Belgium

[21] Appl. No.: 789,496

[22] Filed: Oct. 21, 1985

[30] Foreign Application Priority Data

Oct. 23, 1984 [BE] Belgium ............... PV 0/213873

[51] Int. Cl.[4] ............................................. A47C 3/00
[52] U.S. Cl. .................................. 297/285; 297/307; 297/230
[58] Field of Search ............... 297/289, 230, 231, 219, 297/283, 337, 307

[56] References Cited

U.S. PATENT DOCUMENTS

| | | |
|---|---|---|
| 1,265,474 | 5/1918 | Mikulic . |
| 1,273,953 | 7/1918 | Torano . |
| 1,669,567 | 5/1928 | Linder . |
| 1,711,476 | 4/1929 | Cravath et al. ............ 297/307 |
| 2,903,043 | 9/1959 | Kenney . |
| 3,337,260 | 8/1967 | Proctor . |
| 3,810,263 | 5/1974 | Taylor et al. . |

FOREIGN PATENT DOCUMENTS

| | | |
|---|---|---|
| 897046 | 10/1983 | Belgium . |
| 1111965 | 7/1961 | Fed. Rep. of Germany . |
| 1405778 | 11/1968 | Fed. Rep. of Germany . |
| 2420277 | 11/1975 | Fed. Rep. of Germany . |
| 3000433 | 7/1981 | Fed. Rep. of Germany . |
| 131334 | 2/1929 | Switzerland . |

*Primary Examiner*—Francis K. Zugel
*Attorney, Agent, or Firm*—Fleit, Jacobson, Cohn & Price

[57] ABSTRACT

A seat for a vehicle, preferably a motor vehicle, includes a bottom and a back. The back of a passenger bears against the back of the seat. The back of the seat is mounted to swing together with the back of the passenger in a vertical direction. The seat back has a natural frequency which is higher than the natural frequency of the seat bottom when bearing a passenger.

1 Claim, 4 Drawing Figures

SEAT FOR VEHICLE, NOTABLY MOTOR VEHICLE

This invention relates to a seat for vehicle, notably motor vehicle, which comprises a bottom and a back, a portion of which at least whereon bears the back of a passenger taking place in the seat, has a support which is so mounted as to be swingable together with said passenger back, substantially along the back plane and along an up and down direction relative to the bottom.

A seat having such features has been the object of Belgian Patent No. 897,046.

It has notably been stated in said Patent that it is required to lower as much as possible the inertia action on the movable portion from the seat back when same is subjected to up and down oscillations.

The reason thereof lies in the support whereon bears the back of a passenger seated in the seat, having to follow accurately the up and down oscillating motion of the passenger back to obtain the advantageous action on the vertebral column which is mentioned in said Patent.

The essential object of this invention is to define features which the seat should have to obtain fully such advantageous action.

Indeed it has been noticed that a bad selection of such features may to the contrary, have a deleterious action on the passenger back instead of said desired advantageous action.

For this purpose, the seat according to the invention is characterized in that the movable back portion comprising said support, has a natural frequency which lies higher than the natural frequency of the seat bottom bearing the passenger.

Advantageously, the natural frequency of the movable back portion is at least equal to 1.3 times the natural frequency of the seat bottom bearing the passenger.

Other details and features of the invention will stand out from the description given hereinbelow, by way of non limitative example and with reference to the accompanying drawings, in which:

In the various figures, the same reference numerals show similar or identical elements.

FIG. 1 shows a seat for a motor vehicle which comprises a bottom 1 and a back 2, which may possibly be hinged to the bottom back portion.

Figure 1:
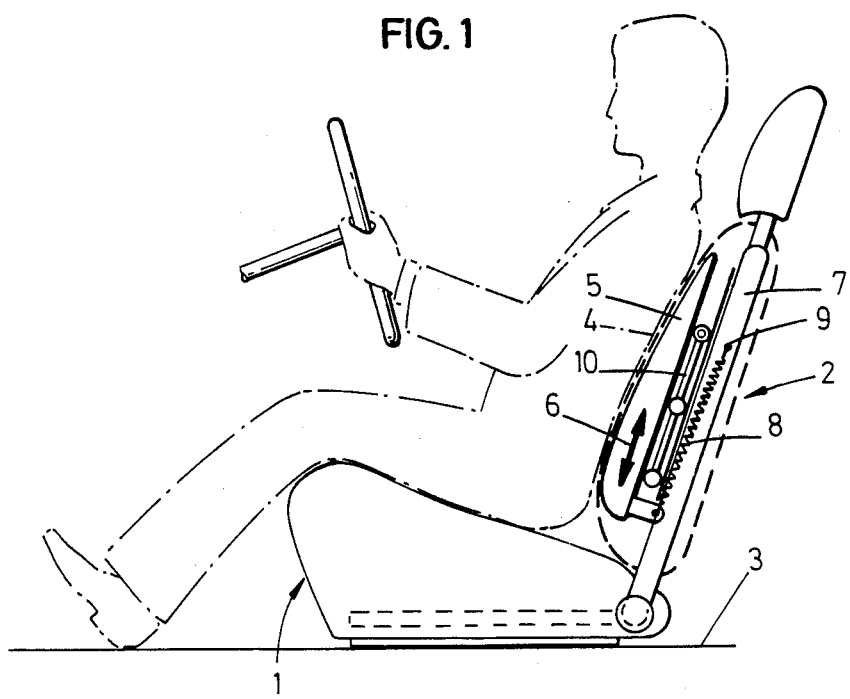
FIG. 1 shows as diagrammatic vertical section view, a seat for a motor vehicle in a first particular embodiment of the invention.

Said bottom is conventionally mounted on the car floor 3, so that the fasteners thereof on the floor have not been shown.

That back portion whereon bears the back 4 of a passenger taking place in the seat, has a support 5 which is so mounted as to be swingable together with the passenger back 4, substantially in the plane of the seat back and along an up and down direction relative to the bottom, as shown by arrows 6. It is of importance that said support 5 be swingable independently from seat bottom 1.

Said support 5 which is made from a relatively light material, is mounted on a frame 7 built in the seat back and extending substantially along the plane thereof, through resilient members 8, notably springs which let said support 5 swing along the direction of arrows 6 relative to a frame fixed point 9.

The support 5 will move relative to fixed frame 7 by means of slideways 10 and hangs from said frame through springs 8, the tension of which might possibly be adjustable.

Advantageously, the natural frequency of the movable portion from said back 2, thus comprising essentially support 5 completed by that portion of slideways 10 which is fast to said support, is at least equal to 1.3 times the natural frequency of the seat bottom 1 as it bears the passenger.

Thus it has been noticed that when the natural frequency of the movable portion is approximately equal to the natural frequency of the seat bottom bearing the passenger, said movable portion does not follow the oscillating motion of the passenger back, and instead of giving an advantageous action for the passenger back, causes deleterious actions which might further worsen the passenger back ache.

This is notably due to to the oscillations of the movable portions in such conditions, being amplified by a resonance action, that is the amplitude of such oscillations becomes much higher than the oscillation amplitude for the seat bottom bearing the passenger.

On the other hand, testing with a seat prototype fitted with a movable back, has allowed to show that when the natural frequency of the movable back portion reaches a value in the range of 1.3 times the natural frequency of the seat bottom bearing the passenger, it is possible to retain said oscillations accurately under control and to obtain that the back swings with the same amplitude as the passenger back subjected to vibrations or oscillations caused by bumps in the road the vehicle moves on.

The higher this factor and the better is the result.

To the contrary, when this factor is progressively lowered below the 1.3 value, the resonance phenomenon becomes akwardly felt and becomes progressively disastrous.

More particularly it has been noticed that for a movable back with a weight in the range of one kilogramme and a suspension having a very low friction factor, that zone wherein said resonance may occur is very narrow, that is when the value of the natural frequency ratio decreases below 1.3, the amplitude of the movable back oscillations increases very rapidly, but when the value of such ratio increases beyond 1.3, said amplitude slowly decreases.

A practical test has ben made by means of a seat the back of which was fitted with a movable portion having a weight in the range of 1 kg, a suspension with a negligible friction factor and an elongation factor of one third of a kilogramme per centimeter, that is 0.333 kg/cm; the bottom foundation was such as to cause a sagging in the range of 5 cm under the action of the weight of a passenger with a weight of 75 kg.

When the friction factor is negligible, the natural frequencies are computed by means of the following relation:

$$f(\text{sec}^{-1}) = 4.895 \times \sqrt{\frac{k \, (\text{kg/cm})}{m \, (\text{kg})}}$$

in which the frequency f is given as a number of oscillations per second, the elongation factor k as kilogrammes per centimeter, and the weight of the movable unit m as kilogrammes.

In the above conditions, the natural frequency of the movable portion has a value equal to 1.3 times the natural frequency of the seat bottom bearing the passenger with a weight of 75 kg. The test has shown that said movable portion did indeed swing in phase with and with the same amplitude as the passenger back.

Another test has been made with a movable portion lightened down to a weight of 0.75 kg, while retaining the same suspension.

The result for the passenger back was even better, that is the movable portion did follow even more closely the passenger back oscillations; this was notably due to the natural frequency ratio reaching 1.5 in such a case.

Still another test was made with a behavior movable portion, up to about 1.5 kg, while still retaining the same suspension.

The result of this test was not satisfactory and some friction did occur between the passenger back and the support 5 is was bearing against.

This was due to the natural frequency ratio being 1.05.

Following said last test, the seat back has been improved by using for the movable portion, a somewhat less flexible suspension having an elongation factor of 0.5 kg per cm. This did return the natural frequency ratio to 1.3, and a quite satisfactory result has been obtained in further tests.

To make the above-described tests, it was assumed that the friction factor for the movable back portion was negligible.

It is clear that in actual practice, it is not possible to avoid some friction.

The test results do however show that when the friction is low, the above considerations and conclusions remain valid.

Figure 2:
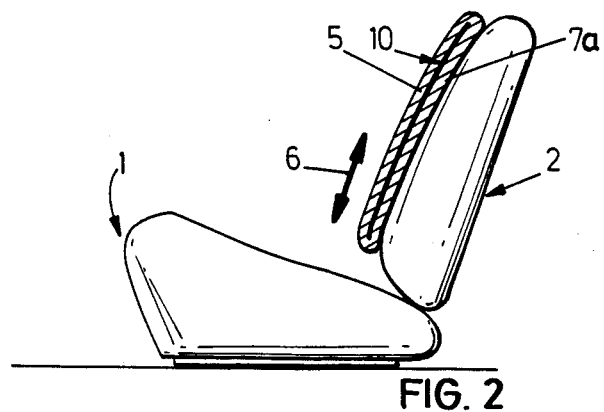
FIG. 2 shows as diagrammatic vertical section view, a seat for a motor vehicle in a second particular embodiment of the invention.
Figure 3:
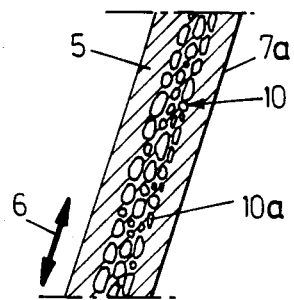
FIG. 3 shows on a large scale, a vertical section through part of the seat in a fist variation of the embodiment as shown in FIG. 2.
Figure 4:
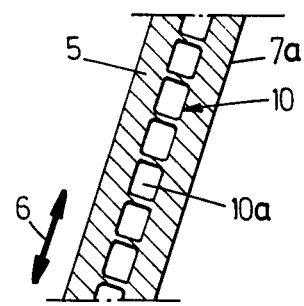
FIG. 4 shows on a larger scale, a vertical section of part of the seat in a second variation of the embodiment as shown in FIG. 2.

A second embodiment of the seat according to the invention has been shown in FIGS. 2 to 4.

This embodiment lies in securing for example by means of straps not shown, a cushion 5, 10, 7a to the seat back 2. Said cushion is relatively thin, in the range of a few centimeters thickness, and it is preferably manufactured from a flexible material, for example a rubber or synthetic foam with a suitable consistence.

More particularly, in the embodiment as shown in FIGS. 2 to 4, the cushion has two outer layers 5 and 7a from flexible material extending over the large sides thereof and separated from one another by an intermediate layer 10 which is distortable in a plane lying substantially in parallel relationship with said sides, notably along a direction lying in a substantially vertical plane, while being less distortable along an approximately horizontal direction substantially at right angle to said layers.

The layer 7a is made fast to seat back 2, in such a way that layer 5 the passenger back does bear against, may slide relative to layer 7a along the direction of arrows 6.

Consequently said layer 5 comprises the movable back portion.

FIGS. 3 and 4 show two particular embodiments of the intermediate layer 10 allowing such sliding. Said figures diagrammatically show a section along a plane at right angle to layers 5 and 7a.

As shown in FIG. 3, the intermediate layer 10 has numerous occluded air bubbles 10a in such a way that due to the lowering in the layer shear strength, the sliding occurs mainly along the direction of arrows 6.

To the contrary, the air contained inside said bubbles being occluded, the cushion has a good compression strength along a direction at right angle to layers 5, 10 and 7a.

FIG. 4 shows an intermediate layer 10 wherein evenly distributed substantially identical cells are provided. The bubbles or cells may have an elongated shape in the vertical direction, to make it easier for the movable layer 5 to swing along a substantially vertical direction relative to oscillations along substantially horizontal directions.

According to the invention, the material and the manufacture of the cushion have to be such that the weight and return power of the movable layer 5 impart thereto a natural frequency which is higher than the natural frequency of the passenger-bearing seat bottom, a preferred frequency ratio being equal to or higher than 1.3.

It must be understood that the invention is not limited to the above-described embodiments and that many changes may be brought thereto without departing from the scope of the invention as defined in the accompanying claims.

For instance, instead of the slideway-mounted movable support as shown in FIG. 1, there may be considered a support comprised of two flexible sheets from suitable synthetic fabric having a very low mutual friction factor, the one sheet being secured to the back of the car seat, and the other sheet covering the first one resiliently suspended from the seat back, and bearing the passenger back support. Said latter sheet comprises the movable support as defined by this invention. In view of the sheet low weight, said sheet will always have a much higher natural frequency than the natural frequency of the passenger-bearing seat bottom.

I claim:

1. A vehicle seat comprising:
   a frame,
   a seat mounted on said frame for resiliently supporting a passenger and having a natural frequency, and
   a back support mounted on said frame and having a natural frequency for reciprocation with the back of the passenger only in a direction toward and away from said seat,
   said back support having its natural frequency at least 1.3 times the natural frequency of said seat when bearing passengers of all weights so that said back support follows the oscillating motion of the back of the passenger with the same amplitude as the back of the passenger when the back of the passenger is subjected to vibrations caused by bumps in a road over which the vehicle seat travels.

* * * * *